United States Patent
Rebiere et al.

(10) Patent No.: US 12,192,652 B2
(45) Date of Patent: *Jan. 7, 2025

(54) METHOD AND APPARATUS FOR ESTIMATING A VALUE IN A TABLE GENERATED BY A PHOTOSITES MATRIX

(71) Applicant: STMicroelectronics France, Montrouge (FR)

(72) Inventors: Valentin Rebiere, Grenoble (FR); Antoine Drouot, Paris (FR)

(73) Assignee: STMicroelectronics France, Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,117

(22) Filed: Oct. 6, 2023

(65) Prior Publication Data

US 2024/0048863 A1 Feb. 8, 2024

Related U.S. Application Data

(63) Continuation of application No. 17/199,444, filed on Mar. 12, 2021, now Pat. No. 11,818,476.

(30) Foreign Application Priority Data

Mar. 18, 2020 (FR) ...................... 2002673

(51) Int. Cl.
*H04N 25/60* (2023.01)
*H04N 23/84* (2023.01)
(Continued)

(52) U.S. Cl.
CPC ........... *H04N 25/60* (2023.01); *H04N 23/843* (2023.01); *H04N 25/13* (2023.01); *H04N 25/705* (2023.01)

(58) Field of Classification Search
CPC ...... H04N 25/60; H04N 23/843; H04N 25/13; H04N 25/705; G06T 3/4015
(Continued)

(56) References Cited

U.S. PATENT DOCUMENTS 3,971,065 A 7/1976 Bayer
8,873,847 B2 10/2014 Alacoque
(Continued)

OTHER PUBLICATIONS

Alleysson, D., et al., "Linear Demosaicing Inspired by the Human Visual System", IEEE Trans. Image Process., vol. 14, No. 4, Apr. 2005, 12 pages.
(Continued)

*Primary Examiner* — Lin Ye
*Assistant Examiner* — Chan T Nguyen
(74) *Attorney, Agent, or Firm* — Slater Matsil, LLP

(57) ABSTRACT

An embodiment method for estimating a missing or incorrect value in a table of values generated by a photosite matrix comprises a definition of a zone of the table comprising the value to be estimated and other values, referred to as neighboring values, and an estimation of the value to be estimated based on the primary neighboring values and the weight associated with these primary neighboring values, wherein a weight of each neighboring value, referred to as primary neighboring value, of the same colorimetric component as that of the missing or incorrect value to be estimated, is determined according to differences between neighboring values disposed on an axis and neighboring values disposed parallel with this axis and positioned in relation to this axis on the same side as the primary neighboring value for which the weight is determined.

20 Claims, 4 Drawing Sheets

(51) Int. Cl.
*H04N 25/13* (2023.01)
*H04N 25/705* (2023.01)

(58) Field of Classification Search
USPC .......................................................... 348/242
See application file for complete search history.

(56) References Cited

U.S. PATENT DOCUMENTS

| | | | | |
|---|---|---|---|---|
| 2009/0066821 | A1* | 3/2009 | Achong | H04N 23/843 348/E5.091 |
| 2013/0051665 | A1* | 2/2013 | Shinozaki | G06T 5/00 382/167 |
| 2014/0368701 | A1* | 12/2014 | Shi | H04N 25/134 348/246 |
| 2015/0022869 | A1* | 1/2015 | Shi | H04N 1/40012 358/482 |
| 2018/0288281 | A1* | 10/2018 | Rangnekar | H04N 1/484 |
| 2019/0379336 | A1* | 12/2019 | Takeuchi | H03F 3/45183 |

OTHER PUBLICATIONS

Chang, L., et al., "Hybrid Color Filter Array Demosaicking for Effective Artifact Suppression", J. Electron. Imaging, vol. 15, No. 1, Jan.-Mar. 2006, 40 pages.
Foix, S., et al., "Lock-in Time-of-Flight (ToF) Cameras: A Survey", IEEE Sens. J., vol. 11, No. 3, Sep. 2011, 11 pages.
Fossum, E. R., et al., "A Review of the Pinned Photodiode for CCD and CMOS Image Sensors", IEEE J. Electron Devices Soc., vol. 2, No. 3, May 2014, 34 pages.
Gunturk, B. K., et al., "Demosaicking: Color filter Array Interpolation", IEEE Signal Process. Mag., (44), Jan. 2005, 11 pages.
Hore, A., et al., "An Edge-Sensing Generic Demosaicing Algorithm with Application to Image Resampling", IEEE Trans. Image Process., vol. 20, No. 11, Nov. 2011, pp. 3136-3150.
Je, C., et al., "High-Contrast Color-Stripe Pattern for Rapid Structured-Light Range Imaging", Lect. Notes Comput. Sci., vol. 3021, May 10, 2004, 13 pages.
Jin, S., et al., "Fine Directional De-interlacing Algorithm Using Modified Sobel Operation", IEEE Trans. Consum. Electron., vol. 54, No. 2, May 2008, pp. 857-862.
Kim, W., et al., "A 1.5Mpixel RGBZ CMOS Image Sensor for Simultaneous Color and Range Image Capture," Digest of Technical Papers, IEEE International Solid-State Circuits Conference, vol. 55, No. Jun. 2011, pp. 392-393.
Kimmel, R., "Demosaicing: Image Reconstruction from Color CCD Samples", IEEE Transactions on Image Processing, vol. 8, No. 9, Sep. 1999, 8 pages.
Kodak "Kodak Lossless True Color Image Suite", http://r0k.us/graphics/kodak/, Nov. 15, 1999, 4 pages.
Microsoft, "Xbox 360 Kinect Sensor Manual", Nov. 2010, 19 pages.
Pei, S., et al., "Effective Color Interpolation in CCD Color Filter Arrays Using Signal Correlation", IEEE Transactions on Circuits and Systems for Video Technology, vol. 13, No. 6, Jun. 2003, pp. 503-513.
Shi, L., et al., "Demosaicing for RGBZ Sensor, "Proceedings of SPIE-IS&T Electronic Imaging, vol. 8657, 2013, 9 pages, Downloaded From: http://proceedings.spiedigitallibrary.org/ on Jul. 12, 2016 Terms of Use: http://spiedigitallibrary.org/ss/TermsOfUse.aspx.
Wang, Z. et al., "Image Quality Assessment: From Error Visibility to Structural Similarity", IEEE Transactions Image Processing, vol. 13, No. 4, Apr. 2004, 14 pages.
Xiangxi, Z., et al., "FPGA implementation of edge detection for Sobel operator in eight directions", IEEE Asia Pacific Conference on Circuits and Systems, APCCAS, Oct. 26-30, 2018, pp. 520-523.
Zhang, L., et al., "Color demosaicking by local Directional interpolation and nonlocal adaptive thresholding", Journal of Electronic Imaging, 20(2), 023016, Apr.-Jun. 2011, pp. 1-29.

\* cited by examiner

[Fig 1]
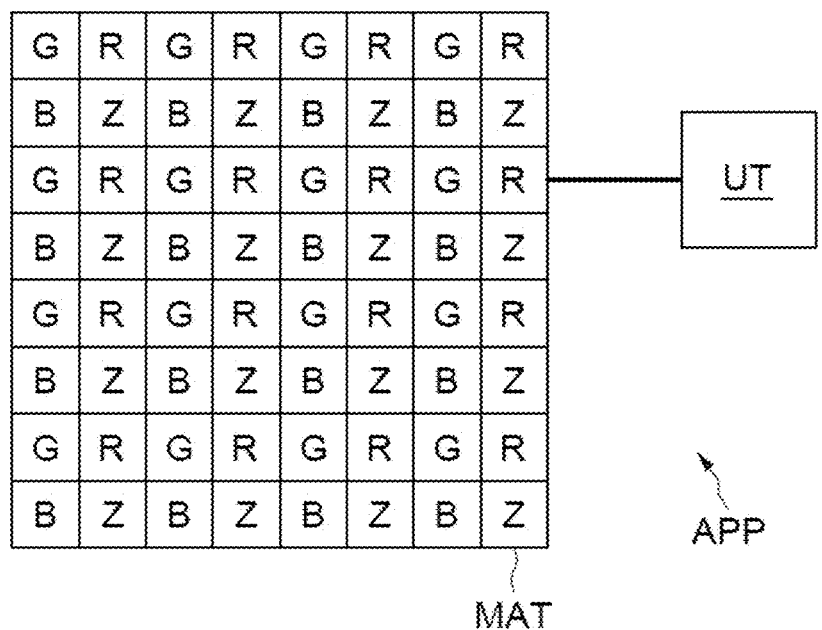
MAT
UT
APP
[Fig 2]
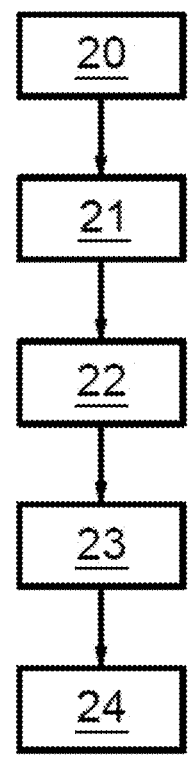

[Fig 3]

|   |   |   |   |   |
|---|---|---|---|---|
| $Z_0$ | $B_1$ | $Z_2$ | $B_3$ | $Z_4$ |
| $R_5$ | $G_6$ | $R_7$ | $G_8$ | $R_9$ |
| $Z_{10}$ | $B_{11}$ | $Z_{12}$ | $B_{13}$ | $Z_{14}$ |
| $R_{15}$ | $G_{16}$ | $R_{17}$ | $G_{18}$ | $R_{19}$ |
| $Z_{20}$ | $B_{21}$ | $Z_{22}$ | $B_{23}$ | $Z_{24}$ |

NOY

[Fig 4]

[Fig 5]
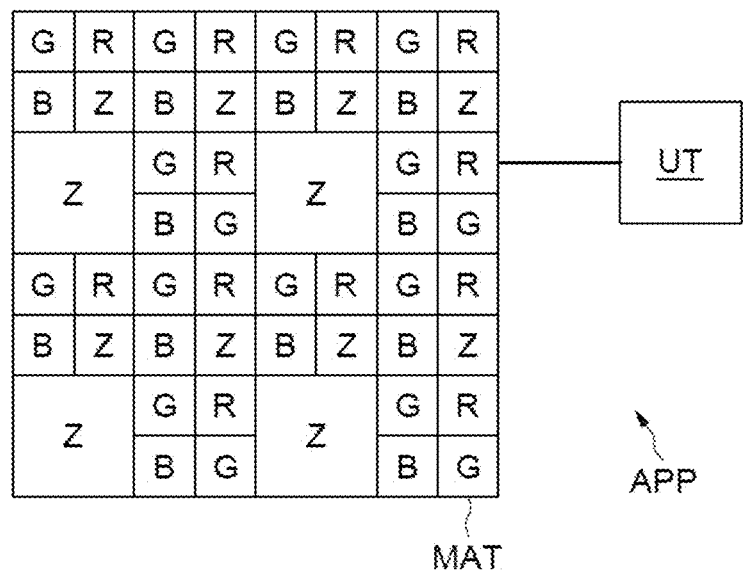
[Fig 6]
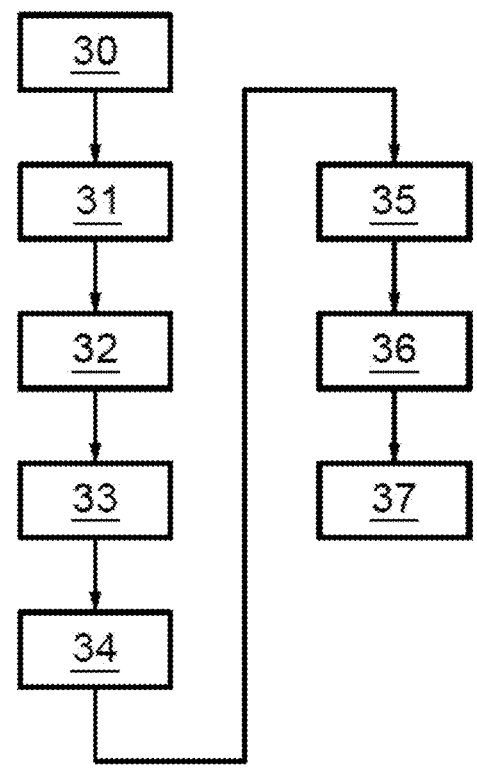

METHOD AND APPARATUS FOR ESTIMATING A VALUE IN A TABLE GENERATED BY A PHOTOSITES MATRIX

CROSS-REFERENCE TO RELATED APPLICATIONS

This application is a continuation of U.S. patent application Ser. No. 17/199,444, filed on Mar. 12, 2021, which claims the benefit of French Application No. 2002673, filed on Mar. 18, 2020, which applications are hereby incorporated herein by reference.

TECHNICAL FIELD

Embodiments and implementations relate to the processing of photosites, in particular in apparatuses comprising photographic sensors, or a combination of photographic sensors and depth sensors.

BACKGROUND

Photographic sensors are known, comprising a matrix of photosites (also described using the term "monochromatic pixels") suitable for capturing a light intensity according to different colorimetric components. In particular, each photosite comprises a photosensitive sensor, such as a CMOS sensor, covered with a color filter suitable for filtering a given colorimetric component of an illumination. Each photofilter is then associated with this colorimetric component.

In particular, the photofilters can be disposed according to a Bayer matrix well known to those skilled in the art. According to this Bayer matrix, some photosites are associated with green, others with red, and the rest of the photosites are associated with blue.

The photosite matrix makes it possible to generate a table of values proportional the illumination of the photosites for each colorimetric component, this table having the same configuration as the photosite matrix.

SUMMARY

It is then possible to obtain an image by performing a dematrixing method on this table of values. In particular, a digital interpolation is performed between the values generated by the photosites, so as to match a triplet of red, green, and blue values for each pixel of the image.

Nevertheless, a photographic sensor may include defective photosites liable to generate aberrant values inducing undesirable artifacts in the image obtained after dematrixing.

There is therefore a need for a method for correcting the value of the defective photosites so as to reduce the artifacts in the image obtained after dematrixing.

Moreover, apparatuses comprising a combination of photographic sensors and depth sensors are also known. In particular, monolithic sensors, referred to as RGBZ sensors, are known, comprising a photosite matrix wherein some photosites have been replaced by depth sensors, such as time-of-flight sensors. The depth sensors are disposed according to a predetermined spatial organisation in the matrix.

Replacing some photosites by depth sensors induces a loss of colorimetric information at the location of the depth sensors. However, in order to carry out dematrixing, it is necessary to have a full photosite matrix. In order to obtain a full photosite matrix, it is needed to introduce fictitious photosites at the location of the depth sensors. In other words, missing values relating to an illumination in the table of values generated by the photosites should be estimated, the location of these missing values in the table being the same as that of the depth sensors in the matrix of photosites and depth sensors.

United States Patent Application Publication Number 2015/0022869 describes such a method for estimating missing values in a table of values generated by a photosite matrix. Nevertheless, this estimation method introduces artifacts into the image generated after dematrixing. Furthermore, this method is not suitable for some spatial organisations of the depth sensors in the matrix.

There is therefore a need to propose a method for estimating a missing value in a table of values generated by photosites suitable for approximating a real value that could be generated by a photosite at the location of the depth sensors.

According to an aspect, the invention relates to a method for estimating a missing or incorrect value in a table of values generated by a photosite matrix, the value to be estimated and each other value of the table being associated with a colorimetric component, the method comprising:

a definition of a zone, referred to as kernel, of the table comprising the value to be estimated and other values, referred to as neighboring values, a determination of a weight for each neighboring value, referred to as primary neighboring value, of the same colorimetric component as that of the missing or incorrect value to be estimated, an estimation of the value to be estimated based on the primary neighboring values and the weight associated with these primary neighboring values, the method further comprising a definition in the table of several axes passing through a location of the missing or incorrect value to be estimated, and wherein the weight of each primary neighboring value is determined according to differences between neighboring values disposed in the table on one of the defined axes and neighboring values disposed in the table parallel with this axis and positioned in relation to this axis on the same side as the primary neighboring value for which the weight is determined.

Such a method can be executed by a dedicated integrated circuit or indeed by a programmable data processing unit such as a microprocessor or a microcontroller, the dedicated integrated circuit or the programmable processing unit being suitable for example for being placed on-board an apparatus, such as a cellular mobile telephone or a tablet, equipped with photographic and/or depth sensors.

The missing or incorrect value can be calculated by interpolating the primary neighboring values to which a weight is applied.

The incorrect value to be estimated can originate from a defective photosite. Such an incorrect value can particularly be detected if it is aberrant with respect to the values generated by photosites located next to the defective photosite in the photosite matrix.

The missing value to be estimated can originate from a lack of photosite at a location of the photosite matrix. In particular, the lack of photosite can result from a replacement of a photosite of the photosite matrix by a depth sensor to form an RGBZ monolithic sensor.

Calculating the differences for the determination of the weight of each neighboring value makes it possible to determine the part of the kernel closest to the missing or incorrect value, i.e. the part of the kernel to be used to interpolate the missing or incorrect value.

In particular, the estimation of the missing or incorrect value is based on the assumption that the missing value belongs to the same texture of an image captured by the photosite matrix as the texture represented by the neighboring values of the kernel even if these neighboring values are associated with a different colorimetric component to that associated with the missing or incorrect value to be estimated.

Calculating the differences makes it possible to identify the different structures of the image captured in the table of values so as to identify a direction wherein there is a continuity in the texture. The missing or incorrect value is then estimated according to the direction identified.

Such a method for estimating a missing value makes it possible to obtain a value close to a real value that could be generated by an operational photosite instead of a defective photosite or an operational photosite at the location of a depth sensor.

Thus, such an estimation method makes it possible to enhance the quality of the image obtained after dematrixing with respect to known methods. In particular, such an estimation method makes it possible to reduce the artifacts in the image obtained after dematrixing. The estimation method make it possible in particular to enhance the estimation of the missing value in the high-frequency parts of the image captured and along the narrow edges in the image captured, particularly along edges having a width captured by one to three photosites.

The method also makes it possible to enhance the fineness of the lines in the image obtained from dematrixing.

Preferably, the photosites of the photosite matrix are disposed according to a Bayer matrix.

Advantageously, the axes passing through the missing or incorrect value used for calculating the differences are a vertical axis and a horizontal axis.

Advantageously, the estimation method further comprises a calculation of gradients, referred to as semi-gradients, based on the calculated differences, each semi-gradient being associated with a given direction with respect to the location of the missing or incorrect value to be determined, the weight of each primary neighboring value being determined based on the semi-gradient associated with the direction defined between the location of this primary neighboring value and the location of the missing or incorrect value.

Calculating semi-gradients makes it possible to enhance the estimation of the missing or incorrect pixel. The semi-gradients provide information relating to the probability that the missing or incorrect value to be estimated belongs to one side of the kernel.

Preferably, eight semi-gradients are calculated for eight given directions along four axes passing through the location of the missing or incorrect value. Advantageously, these four axes are one horizontal axis, one vertical axis, and two diagonal axes.

In an advantageous implementation, the estimation method comprises a discrimination of the semi-gradients by a Gaussian function, the weights of the primary neighboring values being calculated based on the discriminated semi-gradients.

Further functions can be used to discriminate the semi-gradients. For example, it is possible to use a linear approximation of a Gaussian, or more generally any decreasing function giving a high weight to low semi-gradients and a low weight to high semi-gradients.

In an advantageous implementation, the kernel is centered on the missing or incorrect value.

In an advantageous implementation, the kernel has a size of 5×5 value locations.

In an advantageous implementation, the kernel comprises at least one missing value location surrounded by locations of values generated by photosites, the kernel being centered on the location of the missing value to be estimated.

Alternatively, the kernel comprises a block of 2×2 missing value locations surrounded by locations of values generated by photosites, the kernel being centered on the missing value to be estimated.

Each missing value of the block can be estimated according to an estimation method according to the invention.

In particular, when the kernel comprises a block of 2×2 missing value locations, the estimation method preferably comprises a calculation of at least two gradients, referred to as main gradients—particularly four main gradients—along two orthogonal orientations in relation to one another, each main gradient being calculated based on differences between the neighboring values disposed on one side of an axis passing through the location of the missing or incorrect value to be estimated and the neighboring values disposed on the other side of this axis, this axis being orthogonal to the orientation of this main gradient.

In an advantageous implementation, the estimation method comprises a comparison between two mutually orthogonal main gradients so as to detect a dominant colorimetric rupture line passing through the location of the missing value.

The colorimetric rupture line between two zones of the kernel represents an edge in the image captured.

The estimation method can further comprise a discrimination of the main gradients by a Gaussian function. The comparison can then be carried out between two mutually orthogonal discriminated main gradients.

Further functions can be used to discriminate the main gradients. For example, it is possible to use a linear approximation of a Gaussian, or more generally any decreasing function giving a high weight to low main gradients and a low weight to high main gradients.

In an advantageous implementation, the weight associated with a primary neighboring value is determined according to a main gradient and/or a semi-gradient.

In particular, the weight associated with a primary neighboring value is determined according to a discriminated main gradient and/or a discriminated semi-gradient.

More particularly, the higher a discriminated main gradient is with respect to a discriminated main gradient orthogonal to this first discriminated main gradient, the more the weight is calculated based on this first discriminated main gradient.

Furthermore, the lower a discriminated main gradient is with respect to a discriminated main gradient orthogonal to this first discriminated main gradient, the more the weight is calculated based on a discriminated semi-gradient.

In an advantageous embodiment, the estimation method comprises a calculation of enhanced main gradients based on the main gradients and semi-gradients calculated, the weight associated with a primary neighboring value being determined according to an enhanced main gradient and/or a semi-gradient.

The enhanced main gradients calculated based on semi-gradients make it possible to enhance the detection of fine edges in the image captured.

Advantageously, the estimation method further comprises a discrimination of the enhanced main gradients and the semi-gradients by a Gaussian function, the weights of the primary neighboring values being calculated based on the discriminated enhanced main gradients and/or the discriminated semi-gradients.

In particular, a comparison is carried out between two mutually orthogonal main gradients so as to detect a dominant rupture line passing through the location of the missing value.

Further functions can be used to discriminate the enhanced main gradients. For example, as mentioned above, it is possible to use a linear approximation of a Gaussian, or more generally any decreasing function giving a high weight to low enhanced main gradients and a low weight to high enhanced main gradients.

According to a further aspect, the invention relates to an apparatus, for example a cellular mobile telephone or a tablet, comprising a photographic device comprising a matrix of photosites and at least one depth sensor, and an acquisition and processing unit configured to:
  acquire a table of values proportional to the illumination of the photosites and
  estimate a missing value in the table at the location of the at least one depth sensor according to an estimation method as described above.

In an advantageous embodiment, the matrix of photosites and at least one depth sensor comprises at least one depth sensor surrounded by photosites.

Alternatively, the matrix of photosites and at least one depth sensor comprises at least one block of 2×2 depth sensors surrounded by photosites.

Preferably, the acquisition and processing unit comprises a non-programmable integrated circuit configured to execute the estimation method as described above.

Alternatively, the estimation method can be executed by an electronic programmable data processing unit, such as a microprocessor.

Thus, according to a further aspect, the invention relates to a program product comprising instructions which, when the program is executed by an electronic data processing unit, result in the latter executing a method as described above.

BRIEF DESCRIPTION OF THE DRAWINGS

For Further advantages and features of the invention will emerge on studying the detailed description of implementations and embodiments, which are in no way restrictive, and of the appended drawings wherein:
  FIG. 1 illustrates a first embodiment of a photographic device comprising a matrix of photosites and depth sensors;
  FIG. 2 illustrates a method for estimating a missing value;
  FIG. 3 illustrates a kernel centered on a location of a missing value to be estimated;
  FIGS. 4(a)-4(d) illustrate applied masks;
  FIG. 5 illustrates a second embodiment of a photographic device comprising a matrix of photosites and depth sensors;
  FIG. 6 illustrates a method for estimating a missing value;
  FIG. 7 illustrates different configurations of a kernel according to a missing value to be estimated; and
  FIG. 8 illustrates masks used for calculating four main gradients.

DETAILED DESCRIPTION OF ILLUSTRATIVE EMBODIMENTS

FIG. 1 represents a first embodiment of an apparatus APP according to the invention. The apparatus APP comprises a photographic device comprising a matrix MAT of photosites and depth sensors.

In particular, the matrix MAT is a Bayer matrix wherein some photosites have been replaced by depth sensors.

In particular, each depth sensor is surrounded by photosites. The depth sensors are thus separated from one another.

Each photosite is thus associated with a colorimetric component. For example, a photosite can be associated with red (R) or green (G) or indeed blue (B).

More particularly, the depth sensors (Z) replace some photosites of the same colorimetric component in the Bayer matrix.

The apparatus APP also comprises a data acquisition and processing unit UT. This data acquisition and processing unit can be a non-programmable dedicated integrated circuit or indeed a microprocessor for example.

The acquisition and processing unit UT is configured to acquire a value of each photosite of the matrix MAT, this value being proportional to the illumination of the photosite.

The acquisition and processing unit UT is then configured to save each value in a table. In particular, each value is saved in a location of the table corresponding to the position of the photosite in the matrix MAT. Thus, the table and the matrix MAT have the same configuration. Furthermore, each value/location of the table is associated with a colorimetric component.

The locations corresponding to the position of the depth sensors in the matrix MAT have no value associated therewith due to the lack of photosite. Reference is then made to a missing value.

In order to complete the table to subsequently carry out a dematrixing to obtain an image, it is needed to estimate the values that could be obtained if photosites were indeed present instead of the depth sensors. It is therefore needed to estimate the missing values in the table.

The acquisition and processing unit UT is thus configured to be able to execute a method for estimating a missing value as described hereinafter and represented in FIG. 2. This estimation method can be executed to calculate each missing value of the table.

The estimation method comprises in step 20 a definition of a zone, referred to as kernel NOY, of the table. This kernel NOY comprises the missing value to be estimated and other values, referred to as neighboring values, generated by photosites. The kernel NOY can also comprise further locations having no associated value due to the lack of a photosite replaced by a depth sensor. The kernel NOY has preferably a size of 5×5 value locations. The kernel NOY is centered on the location of the missing value to be estimated. Such a kernel NOY is represented in FIG. 3.

The kernel NOY comprises neighboring values, referred to as primary neighboring values, of the same colorimetric component as the missing value to be estimated. The kernel NOY also comprises neighboring values, referred to as secondary neighboring values, of a different colorimetric component to that of the missing value to be estimated.

In the kernel NOY, the primary neighboring values are aligned along four axes with respect to the missing value: one horizontal axis, one vertical axis, and two diagonal axes.

In order to simplify comprehension, the orientation and the direction of the axes will be indicated with reference to cardinal points. Thus, for example, an axis along an East-West orientation will represent a horizontal axis in the table and an axis along a North-South orientation will represent a vertical axis in the table.

The estimation of the missing value is based on an evaluation of the colorimetric proximity between the primary neighboring values in the eight directions.

In particular, the missing value is calculated based on an interpolation of the primary neighboring values, a weight being applied to each primary neighboring value.

For this purpose, the estimation method comprises a calculation of eight gradients, referred to as semi-gradients.

In particular, the semi-gradients are calculated based on calculations of several differences between the values located on half-kernels NOY. Two semi-gradients are calculated for each orientation. The semi-gradients can be calculated based on primary neighboring values and secondary neighboring values.

The differences are calculated in step 21 according to the formulas indicated hereinafter where I(i,j) are the neighboring values of the kernel NOY, i being the coordinate of the location along the vertical axis and j the coordinate along the horizontal axis in the kernel NOY, I(o,o) representing the missing value to be estimated at the center of the kernel NOY. The index $\eta$ represents a colorimetric plan R (red), G (green), B (blue), Z (depth) associated with the neighboring value I(ij). The differences comprising a missing value are disregarded in these formulas ($\eta$ is equal to 3 for the plane Z, i.e. for the missing values). The index m is equal to 1 or 3.

The differences on the upper part (North) of the kernel NOY are calculated with the following formula. The mask applied is represented in FIG. 4*a*.

$$\text{diff}_{vert}[2m] = |I_{\eta \neq 3}(0, m-2) - I_{\eta \neq 3}(-2, m-2)| \quad \text{[Math 1]}$$

The differences on the lower part (South) of the kernel NOY are calculated with the following formula. The mask applied is represented in FIG. 4*b*.

$$\text{diff}_{vert}[2m] = |I_{\eta \neq 3}(m-2, 0) - I_{\eta \neq 3}(2, m-2)| \quad \text{[Math 2]}$$

The differences on the left part (West) of the kernel NOY are calculated with the following formula. The mask applied is represented in FIG. 4*c*.

$$\text{diff}_{hori}[2m] = |I_{\eta \neq 3}(m-2, 0) - I_{\eta \neq 3}(m-2, -2)| \quad \text{[Math 3]}$$

The differences on the right part (East) of the kernel NOY are calculated with the following formula. The mask applied is represented in FIG. 4*d*.

$$\text{diff}_{hori}[2m+1] = |I_{\eta \neq 3}(m-2, 0) - I_{\eta \neq 3}(m-2, 2)| \quad \text{[Math 4]}$$

Two semi-gradients are calculated in step 22 for each orientation. For example, a semi-gradient oriented towards the North and a semi-gradient oriented towards the South are calculated for the North-South direction. Each semi-gradient is obtained from a sum of differences between neighboring values located on an axis passing through the missing value to be estimated and orthogonal to the orientation of the semi-gradient and neighboring values located in locations extending parallel with this axis and delimiting the kernel NOY in the direction of the semi-gradient.

In particular, the semi-gradient for the North direction is calculated according to the following formula:

$$SG_N = \sum_{k \in \{2;6\}} \text{diff}_{vert}[k] \quad \text{[Math 5]}$$

The semi-gradient for the South direction is calculated according to the following formula:

$$SG_S = \sum_{k \in \{3;7\}} \text{diff}_{vert}[k] \quad \text{[Math 6]}$$

The semi-gradient for the West direction is calculated according to the following formula:

$$SG_W = \sum_{k \in \{2;6\}} \text{diff}_{hori}[k] \quad \text{[Math 7]}$$

The semi-gradient for the East direction is calculated according to the following formula:

$$SG_E = \sum_{k \in \{3;7\}} \text{diff}_{hori}[k] \quad \text{[Math 8]}$$

While The semi-gradient for the North-West direction is calculated according to the following formula:

$$SG_{NW} = \text{diff}_{vert}[2] + \text{diff}_{hori}[2] \quad \text{[Math 9]}$$

The semi-gradient for the South-East direction is calculated according to the following formula:

$$SG_{SE} = \text{diff}_{vert}[7] + \text{diff}_{hori}[7] \quad \text{[Math 10]}$$

The semi-gradient for the North-East direction is calculated according to the following formula:

$$SG_{NE} = \text{diff}_{vert}[6] + \text{diff}_{hori}[6] \quad \text{[Math 11]}$$

The semi-gradient for the South-West direction is calculated according to the following formula:

$$SG_{SW} = \text{diff}_{vert}[3] + \text{diff}_{hori}[3] \quad \text{[Math 12]}$$

Thus, with the kernel NOY represented in FIG. 3, the following formulas are obtained:

$$SG_N = |B_{11} - B_1| + |B_{13} - B_3|$$

$$SG_S = |B_{11} - B_{21}| + |B_{13} - B_{23}|$$

$$SG_E = |R_7 - R_9| + |R_{17} - R_{19}|$$

$$SG_W = |R_7 - R_5| + |R_{17} - R_{15}|$$

$$SG_{NW} = |R_5 - R_7| + |B_{11} - B_1|$$

$$SG_{SE} = |R_{17} - R_{19}| + |B_{13} - B_{23}|$$

$$SG_{SW} = |R_{17} - R_{15}| + |B_{11} - B_{21}|$$

$$SG_{NE} = |R_7 - R_9| + |B_{13} - B_3| \quad \text{[Math 13]}$$

The semi-gradients are then harmonised according to the formula below to compensate for any differences that may be missing due to the locations for which no value is associated, these locations corresponding to the location of the position sensors.

$$SG_{scld} = \frac{SG}{N} \quad \text{[Math 14]}$$

where N is the number of terms used to calculate the corresponding semi-gradient SG, N then being equal to 2.

Each value $SG_{scld}$ is then discriminated using the following Gaussian formula:

$$DSG = e^{-\frac{SG_{scld}^2}{2\left(\min\left(SG_{scld_n}\right)+1\right)^2}} \quad \text{[Math 15]}$$

where min(SGscld$_n$) corresponds to the minimum between the harmonised semi-gradient SGscld for which the discriminated value is calculated and the harmonised semi-gradient oriented in a direction opposite that of the harmonised semi-gradient SGscld for which the discriminated value is calculated. For example, for the calculation of the discriminated North and South semi-gradients DSG, the minimum between the harmonised North semi-gradient and the harmonised South semi-gradient will be considered.

Then, for each primary neighboring value, a weight is calculated in step 23 using the following formula:

$$\omega(i,j)=k(i,j)*DSG(i,j) \quad \text{[Math 16]}$$

where (i,j) are the coordinates of a primary neighboring value, k(i,j) being a weight defined according to other parameters to be taken into consideration for the filtering (for example the distance between the location (i,j) of the primary neighboring value and the missing value to be estimated, or indeed the intensity range of this primary neighboring value), and DSG(i,j) is the discriminated semi-gradient associated with the primary neighboring value for which the weight is calculated (this discriminated semi-gradient being oriented along the same direction as that between this primary neighboring value and the missing value to be estimated).

Each weight $\omega(i,j)$ is then normalised according to the following formula:

$$\omega'(i,j) = \omega(i,j) / \sum_{(g,h) \in \xi} \omega(g,h) \quad \text{[Math 17]}$$

where $\xi$ represents the calculation kernel NOY centered on the missing value and (g,h) are the coordinates of the values in the kernel NOY associated with the same color as that of the missing value.

The missing value is calculated in step 24 by interpolation according to the following formula.

$$I(0,0) = \sum_{(g,h) \in \xi} \omega'(g,h) I(g,h) \quad \text{[Math 18]}$$

Thus, with the kernel NOY represented in FIG. 3, the following formula is obtained to calculate the missing value $G_{12}$ at the location of the value $Z_{12}$.

$$G_{12}=G_6*\omega'_{G_6}+G_8*\omega'_{G_8}+G_{16}*\omega'_{G_{16}}+G_{18}*\omega'_{G_{18}} \quad \text{[Math 19]}$$

Basing the interpolation of the missing value on a semi-gradient calculation as described above, the estimation of the missing value is enhanced with respect to known estimation methods.

When all of the missing values of the table have been estimated, it is then possible to perform a dematrixing of the table to obtain an image.

FIG. 5 represents a second embodiment of an apparatus APP according to the invention. The apparatus APP differs from that in FIG. 1 by the matrix MAT thereof of photosites (R, G, B) and depth sensors (Z).

The matrix MAT is a Bayer matrix wherein some photosites have been replaced by depth sensors (Z). The matrix MAT comprises blocks of 2×2 depth sensors (Z). Each block is surrounded by photosites. The depth sensor blocks are thus separated from one another.

In the same way as described above, the acquisition and processing unit UT is configured to acquire a value of each photosite of the matrix MAT and to save each value in a table.

Furthermore, the acquisition and processing unit UT is configured to execute the method for estimating a missing value described hereinafter and represented in FIG. 6. This estimation method can be executed to calculate each missing value of the table.

The estimation method comprises in step 30 a definition of a zone, referred to as kernel NOY, of the table. This kernel NOY comprises the missing value to be estimated resulting from the replacement of a photosite by a depth sensor of a depth sensor block. The kernel NOY further comprises other values, referred to as neighboring values, generated by photosites. The kernel NOY also comprises locations for which no value is attributed due to the replacement of photosites by the other depth sensors of the depth sensor block. The kernel NOY has preferably a size of 5×5 value locations. The kernel NOY is centered on the location of the missing value to be estimated.

Figures 7, 8:
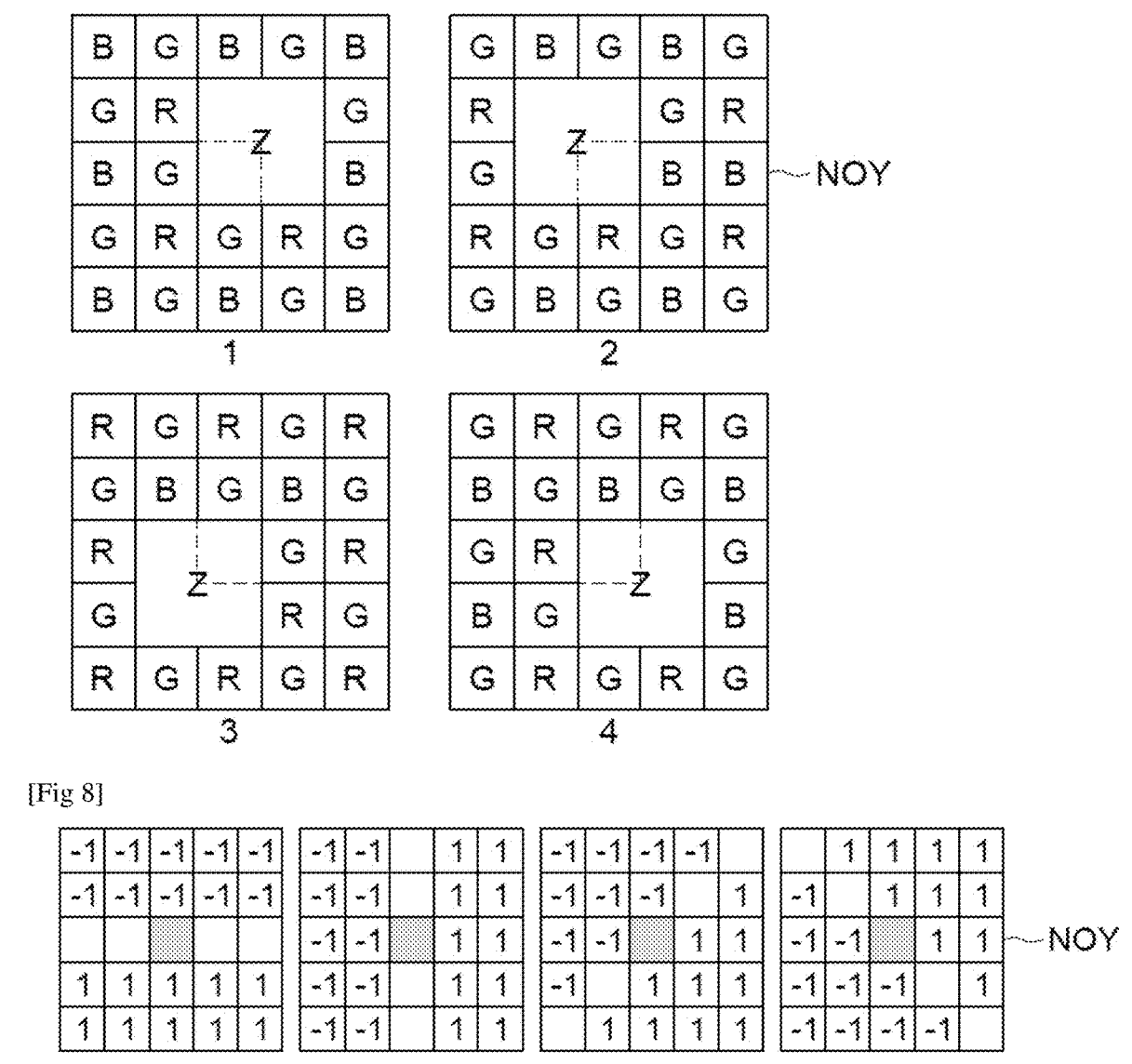

The configuration of the kernel NOY can be different according to the missing value to be estimated. These different configurations are represented in FIG. 7.

The kernel NOY comprises neighboring values, referred to as primary neighboring values, of the same colorimetric component as the missing value to be estimated. The kernel NOY also comprises neighboring values, referred to as secondary neighboring values, of a different colorimetric component to that of the missing value to be estimated.

In the kernel NOY, the primary neighboring values are aligned along four axes with respect to the missing value: one horizontal axis, one vertical axis, and two diagonal axes.

The weights associated with primary neighboring values are calculated based on edge direction coefficient. The edge direction coefficient is obtained based on calculations of gradients, referred to as main gradients, on the entire kernel NOY and gradients, referred to as semi-gradients, on parts of the kernel NOY.

The calculation of the main gradients is performed in step 31 and is based on a sum of differences between neighboring values generated by photosites. The neighboring values can be primary neighboring values or secondary neighboring values. The neighboring values used for the calculation of a given main gradient are located on either side of an axis passing through the missing value to be estimated and being orthogonal to the orientation of this main gradient. This axis therefore delimits two parts of the kernel NOY symmetrical with respect to this axis.

In particular, FIG. 8 represents the masks used for calculating the four main gradients. The locations of the table corresponding to those of depth sensors in the matrix MAT are disregarded for the calculation of the main gradients. Only the neighboring values generated by photosites are used for the calculations of the main gradients.

The use of all of the neighboring values (i.e. those associated with the same colorimetric component or with a different colorimetric component to that of the missing value to be estimated) makes it possible to detect edges according to the three colorimetric components, increase the number of terms in the calculation of the main gradients so as to reduce the impact of noise.

More particularly, the main gradient along the vertical axis of North/South orientation is calculated according to the following formula:

$$Grad_{N-S} = \quad \text{[Math 20]}$$
$$\sum_{m \in [-2,2]} [|I_{\eta \neq 3}(-2, m) - I_{\eta \neq 3}(2, m)| + |I_{\eta \neq 3}(-1, m) - I_{\eta \neq 3}(1, m)|]$$

The main gradient along the horizontal axis of West/East orientation is calculated according to the following formula:

$$Grad_{W-E} = \quad \text{[Math 21]}$$
$$\sum_{m \in [-2,2]} [|I_{\eta \neq 3}(m, -2) - I_{\eta \neq 3}(m, 2)| + |I_{\eta \neq 3}(m, -1) - I_{\eta \neq 3}(m, 1)|]$$

The main gradient along the diagonal axis of North-West/South-East orientation is calculated according to the following formula:

$$Grad_{NW-SE} = \quad \text{[Math 22]}$$
$$\sum_{m \in [-1,1]} [|I_{\eta \neq 3}(m, -2) - I_{\eta \neq 3}(-2, m)| + |I_{\eta \neq 3}(2, m) - I_{\eta \neq 3}(m, 2)|] +$$
$$\sum_{n \in [0,1]} [|I_{\eta \neq 3}(2-n, -2+n) - I_{\eta \neq 3}(-2+n, 2-n)| +$$
$$|I_{\eta \neq 3}(n, -1+n) - I_{\eta \neq 3}(-1+n, n)|]$$

The main gradient along the diagonal axis of North-East/South-West orientation is calculated according to the following formula:

$$Grad_{NE-SW} = \sum_{m \in [-1,1]} [|I_{\eta \neq 3}(m, -2) - I_{\eta \neq 3}(2, -m)| + \quad \text{[Math 23]}$$
$$|I_{\eta \neq 3}(-2, m) - I_{\eta \neq 3}(-m, 2)|] + \sum_{n \in [0,1]} [|I_{\eta \neq 3}(-2+n, -2+n) -$$
$$I_{\eta \neq 3}(2-n, 2-n)| + |I_{\eta \neq 3}(-n, -1+n) - I_{\eta \neq 3}(1-n, n)|]$$

The semi-gradients are obtained based on calculation of differences between the values located on half-kernels NOY. In particular, the differences are calculated in step 32 according to formulas [Math 1] to [Math 4] indicated above and wherein the index m is equal to 0, 1, 3 or 4.

Two semi-gradients are calculated in step 33 for each orientation. For example, a semi-gradient oriented towards the North and a semi-gradient oriented towards the South are calculated for the North-South direction. Each semi-gradient is obtained from a sum of paired differences between neighboring values located on an axis passing through the missing value to be estimated and orthogonal to the orientation of the semi-gradient and the neighboring values located in locations extending parallel with this axis and delimiting the kernel NOY in the direction of the semi-gradient.

In particular, the semi-gradient for the North direction is calculated according to the following formula:

$$SG_N = \sum_{k \in \{0;2;6;8\}} diff_{vert}[k] \quad \text{[Math 24]}$$

The semi-gradient for the South direction is calculated according to the following formula:

$$SG_S = \sum_{k \in \{1;3;7;9\}} diff_{vert}[k] \quad \text{[Math 25]}$$

The semi-gradient for the West direction is calculated according to the following formula:

$$SG_W = \sum_{k \in \{0;2;6;8\}} diff_{hori}[k] \quad \text{[Math 26]}$$

The semi-gradient for the East direction is calculated according to the following formula:

$$SG_E = \sum_{k \in \{1;3;7;9\}} diff_{hori}[k] \quad \text{[Math 27]}$$

The semi-gradient for the North-West direction is calculated according to the following formula:

$$SG_{NW} = \sum_{k \in \{0;2\}} diff_{vert}[k] + diff_{hori}[k] \quad \text{[Math 28]}$$

The semi-gradient for the South-East direction is calculated according to the following formula:

$$SG_{SE} = \sum_{k \in \{7;9\}} diff_{vert}[k] + diff_{hori}[k] \quad \text{[Math 29]}$$

The semi-gradient for the North-East direction is calculated according to the following formula:

$$SG_{NE} = \sum_{k \in \{6;8\}} diff_{vert}[k] + \sum_{k \in \{1;3\}} diff_{hori}[k] \quad \text{[Math 30]}$$

The semi-gradient for the South-West direction is calculated according to the following formula:

$$SG_{SW} = \sum_{k \in \{1;3\}} diff_{vert}[k] + \sum_{k \in \{4;6\}} diff_{hori}[k] \quad \text{[Math 31]}$$

The semi-gradients are then harmonised according to the formula below to compensate for any differences that may be missing due to the locations for which no value is associated, these locations corresponding to the location of the position sensors.

$$SG_{scld} = \frac{SG}{N} \quad \text{[Math 32]}$$

where N is the number of terms used to calculate the corresponding semi-gradient SG, N then being equal to 3 or 4.

Each value $SG_{scld}$ is then discriminated using the following Gaussian formula:

$$DSG = e^{-\frac{SG_{scld}^2}{2\left(min(SG_{scld_n})+1\right)^2}} \qquad \text{[Math 33]}$$

where $min(SGscld_n)$ corresponds to the minimum of the eight semi-gradients calculated.

An enhanced gradient IG is then calculated for each of the four gradients.

$$IG = \frac{1}{k_{tot}}(Grad + SG_1 + SG_2) \qquad \text{[Math 34]}$$

Where ktot is a normalisation factor corresponding to the number of terms used to calculate the main gradient Grad and the semi-gradients $SG_1$ and $SG_2$, the semi-gradients are two semi-gradients associated with the orientation of the main gradient. For example, for a main gradient having a North-West orientation, the first semi-gradient $SG_1$ is the semi-gradient for the North direction $SG_N$ and the second semi-gradient $SG_2$ is the semi-gradient for the West direction $SG_W$.

Each value IG is then discriminated using the following Gaussian formula:

$$DIG = e^{-\frac{IG^2}{2(min(IG_n)+1)^2}} \qquad \text{[Math 35]}$$

where $min(IG_n)$ corresponds to the minimum of the four gradients calculated.

The discrimination of the enhanced main gradients and that of the semi-gradients makes it possible to compare the enhanced main gradients with one another and with the semi-gradients.

In particular, for the calculation of each weight associated with a primary neighboring value, a comparison is performed in step 34 between the discriminated enhanced main gradient DIGori the orientation whereof is the same as that between this primary neighboring value and the missing value to be estimated and the discriminated enhanced main gradient DIGoriort orthogonal to this first discriminated enhanced main gradient DIGori. The comparison is performed using the following formula:

$$\lambda_{ori} = \frac{DIG_{ori}}{DIG_{ori} + DIG_{ori_{ort}}} \qquad \text{[Math 36]}$$

This comparison makes it possible to determine an edge in the image captured, i.e. a colorimetric rupture line between two juxtaposed zones of an image. This comparison makes it possible to adapt the calculation of the weight associated with the primary neighboring value.

In particular, for each direction dir along each orientation ori, an edge direction coefficient is calculated in step 35 according to the following formula:

$$\gamma_{dir} = \lambda_{ori} * DIG_{ori} + (1 - \lambda_{ori}) * DSG_{dir} \qquad \text{[Math 37]}$$

The comparison $\lambda_{ori}$ makes it possible to identify whether the edge direction coefficient should be based mostly on the discriminated enhanced main gradient DIGori or on the discriminated semi-gradient DSGdir.

For example, to calculate the edge direction coefficient in the North part of the kernel NOY, the comparison is performed between the North/South discriminated enhanced main gradient, $DIG_{N/S}$, and the West/East discriminated enhanced main gradient, $DIG_{W/E}$, so as to identify whether the edge direction coefficient should be based mostly on the North/South discriminated enhanced main gradient, $DIG_{N/S}$, (the edge then extending along a North-South axis) or on the North discriminated semi-gradient $DIG_N$ (the edge then extending along a West-East axis).

Then, for each primary neighboring value, a weight is calculated in step 36 using the following formula:

$$\omega(i,j) = K(i,j) * \gamma(i,j) \qquad \text{[Math 38]}$$

where (i,j) are the coordinates of a primary neighboring value, k(i,j) being a weight defined according to other parameters to be taken into consideration for the filtering (for example the distance between the location (i,j) of the primary neighboring value and the missing value to be estimated, or indeed the intensity range of this primary neighboring value), and $\gamma(i,j)$ is the edge direction coefficient $\gamma_{dir}$ associated with this primary neighboring value.

The direction coefficient makes it possible to associate with a primary neighboring value:
- a weight essentially defined by a discriminated enhanced main gradient if the location of this primary neighboring value is located on an edge of the image captured, or
- a weight essentially defined by a discriminated semi-gradient if the location of this primary neighboring value is located on one side of an edge of the image captured.

In particular, the discriminated semi-gradients make it possible to consider the local textures on the side of an edge in the image captured to determine the missing value to be estimated.

Thus, the edge direction coefficient $\gamma_{dir}$ makes it possible to either homogenise the missing value with neighboring missing values associated with the same zone of the image captured, so as to obtain a smooth portion in the image after dematrixing, or have more pronounced edges in the image after dematrixing.

Each weight $\omega(ij)$ is then normalised according to the following formula:

$$\omega'(i,j) = \omega(i,j) / \sum_{(g,h) \in \xi} \omega(g,h) \qquad \text{[Math 39]}$$

where $\xi$ represents the calculation kernel NOY centered on the missing value and (g,h) are the primary neighboring values in the kernel NOY.

The missing value is finally calculated in step 37 by interpolation according to the following formula.

$$I(0,0) = \sum_{(g,h) \in \xi} \omega'(g,h) I(g,h) \qquad \text{[Math 40]}$$

When all of the missing values of the table have been estimated, it is then possible to perform a dematrixing of the table to obtain an image.

Obviously, the present invention is suitable for various alternative embodiments and modifications which will be obvious to those skilled in the art. For example, an estimation method according to the invention can also be applied to estimate an incorrect value resulting from a defective photosite after identifying this incorrect value. In particular, an incorrect value can be identified by detecting an aberrant value in the table generated by a photosite matrix.

What is claimed is:

1. A method for estimating a missing or incorrect value, the method comprising:
   defining a kernel of a table of values comprising a value to be estimated and neighboring values, the table of values being generated by a photosite matrix, the kernel having a missing or incorrect value location surrounded by locations of values generated by photosites, the missing or incorrect value location being the value to be estimated;
   determining a weight for each primary neighboring value of a same colorimetric component as that of the missing or incorrect value to be estimated;
   calculating semi-gradients, based on differences between neighboring values of the table, each semi-gradient being associated with a given direction with respect to the location of the missing or incorrect value to be determined, the weight of each primary neighboring value being determined based on the semi-gradient associated with a direction defined between the location of each primary neighboring value and the location of the missing or incorrect value; and
   estimating the value to be estimated based on the primary neighboring values and the weight associated with the primary neighboring values.

2. The method of claim 1, wherein the photosite matrix is a Bayer matrix.

3. The method of claim 1, wherein the kernel has a size of 5×5 value locations.

4. The method of claim 1, wherein eight semi-gradients are calculated for eight given directions along four axes passing through the location of the missing or incorrect value.

5. The method of claim 4, wherein the four axes are one horizontal axis, one vertical axis, and two diagonal axes.

6. The method of claim 1, wherein estimating the value comprises a discrimination of the semi-gradients by a Gaussian function, the weights of the primary neighboring values being calculated based on the discriminated semi-gradients.

7. The method of claim 1, wherein estimating the value comprises a discrimination of the semi-gradients by a linear approximation of a Gaussian function.

8. The method of claim 1, wherein the kernel is centered on the missing or incorrect value.

9. The method of claim 1, wherein each semi-gradient is obtained from a sum of differences between neighboring values located on an axis passing through the missing or incorrect value and orthogonal to an orientation of the semi-gradient and neighboring values located in locations extending parallel with this axis and delimiting the kernel in the direction of the semi-gradient.

10. A computer program product stored on a storage device, the computer program product comprising instructions to be executed by a microprocessor, the instructions when executed causing the microprocessor to:
    define a kernel of a table of values comprising a value to be estimated and neighboring values, the table of values being generated by a photosite matrix, the kernel having a missing or incorrect value location surrounded by locations of values generated by photosites, the missing or incorrect value location being the value to be estimated;
    determine a weight for each primary neighboring value of a same colorimetric component as that of the missing or incorrect value to be estimated;
    define, in the table, several axes passing through a location of the missing or incorrect value to be estimated, the weight of each primary neighboring value being determined according to differences between neighboring values disposed in the table on one of the defined axes and neighboring values disposed in the table parallel with the one of the defined axes and positioned in relation to the one of the defined axes on a same side as the primary neighboring value for which the weight is determined;
    calculate semi-gradients, based on the differences, each semi-gradient being associated with a given direction with respect to the location of the missing or incorrect value to be determined, the weight of each primary neighboring value being determined based on the semi-gradient associated with a direction defined between the location of each primary neighboring value and the location of the missing or incorrect value; and
    estimate the value to be estimated based on the primary neighboring values and the weight associated with the primary neighboring values.

11. The computer program product of claim 10, wherein the kernel is centered on the missing or incorrect value to be estimated.

12. The computer program product of claim 10, wherein the kernel has a size of 5×5 value locations.

13. The computer program product of claim 10, wherein the instructions are further configured to calculate at least two main gradients along two orthogonal orientations in relation to one another, each main gradient being calculated based on differences between the neighboring values disposed on one side of an axis passing through the location of the missing or incorrect value to be estimated and the neighboring values disposed on an other side of the axis, the axis being orthogonal to the orientation of the each main gradient.

14. The computer program product of claim 13, wherein the instructions are further configured to compare between two mutually orthogonal main gradients so as to detect a dominant colorimetric rupture line passing through the location of the missing value.

15. The computer program product of claim 10, wherein the photosites of the photosite matrix are disposed according to a Bayer matrix.

16. An apparatus comprising:
    a photosite matrix comprising photosites; and
    a data acquisition and processing unit comprising a microprocessor, the data acquisition and processing unit being configured to:
    acquire a table of values proportional to an illumination of the photosites,
       wherein the table comprises a missing value at a location of one depth sensor, and wherein the missing value and each neighboring value of the table are associated with a colorimetric component;
    define a kernel of the table comprising the missing value and the neighboring values, the location of the missing value being surrounded by locations of neighboring values;
    determine a weight for each primary neighboring value of a same colorimetric component as that of the missing value;

define, in the table, several axes passing through a location of the missing value, wherein the weight of each primary neighboring value is determined according to differences between neighboring values disposed in the table on one of the defined axes and neighboring values disposed in the table parallel with the one of the defined axes and positioned in relation to the one of the defined axes on a same side as the primary neighboring value for which the weight is determined;

calculate semi-gradients, based on the differences, each semi-gradient being associated with a given direction with respect to the location of the missing value, the weight of each primary neighboring value being determined based on the semi-gradient associated with a direction defined between the location of each primary neighboring value and the location of the missing value;

estimate the missing value based on the primary neighboring values and the weight associated with the primary neighboring values; and correct the missing value.

17. The apparatus of claim 16, wherein the apparatus is a mobile telephone.

18. The apparatus of claim 16, wherein the apparatus is a tablet.

19. The apparatus of claim 16, wherein each photosite is associated with red, green, or blue.

20. The apparatus of claim 16, wherein the data acquisition and processing unit comprises a non-programmable integrated circuit.

* * * * *